Figures 1, 2, 6:
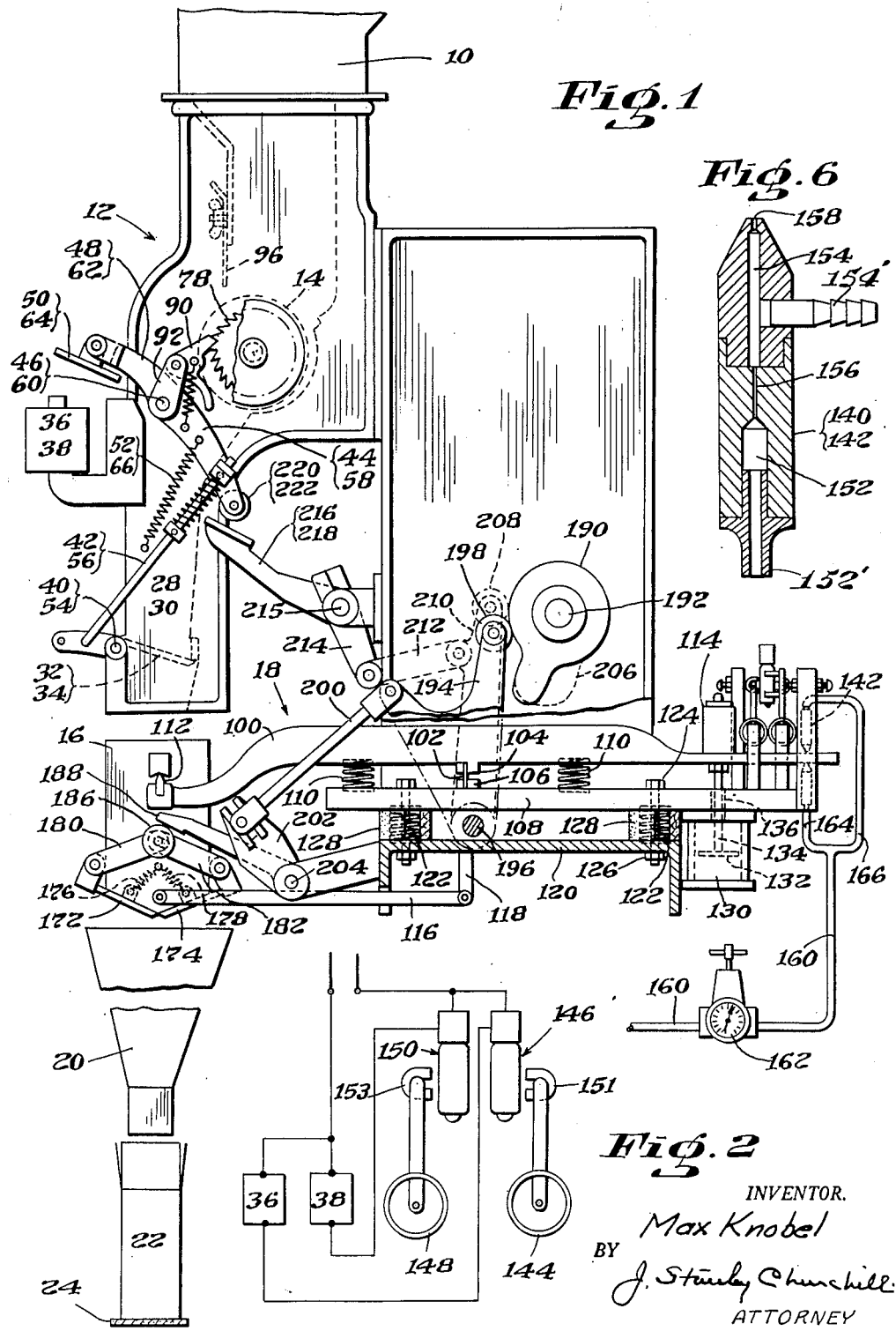

April 7, 1953 M. KNOBEL 2,634,082
WEIGHING MACHINE
Filed Oct. 29, 1948 2 SHEETS—SHEET 1

INVENTOR.
Max Knobel
BY J. Stanley Churchill
ATTORNEY

April 7, 1953  M. KNOBEL  2,634,082
WEIGHING MACHINE
Filed Oct. 29, 1948  2 SHEETS—SHEET 2
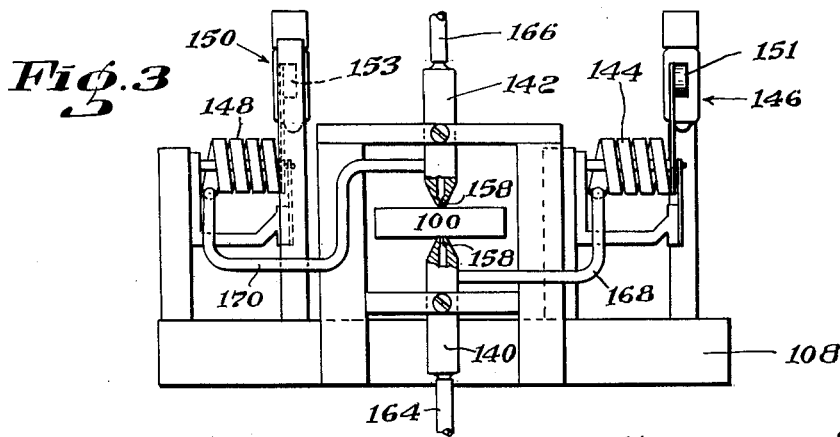
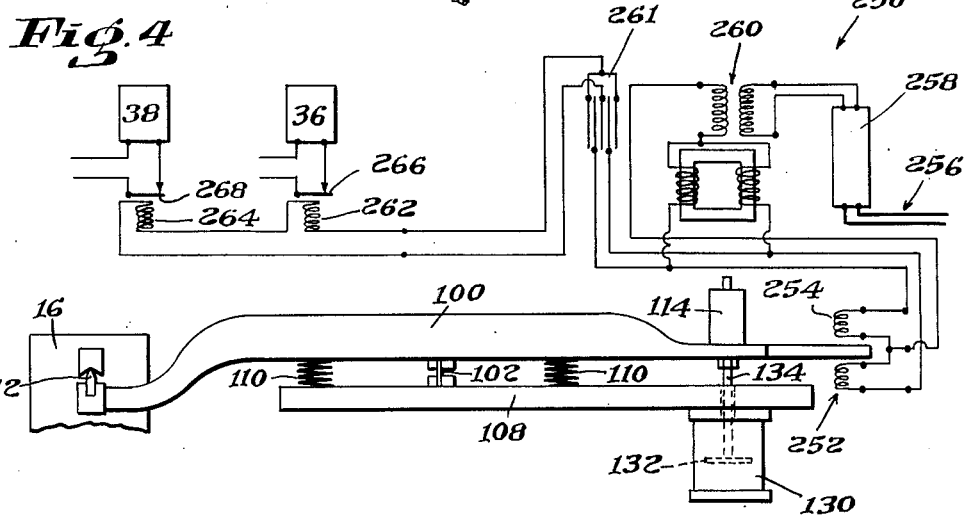
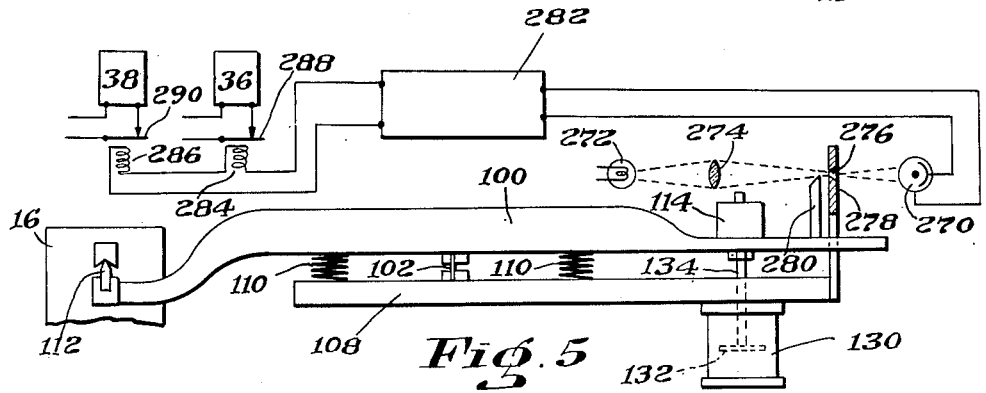
INVENTOR.
Max Knobel
BY J. Stanley Churchill
ATTORNEY Patented Apr. 7, 1953

2,634,082

UNITED STATES PATENT OFFICE 2,634,082

WEIGHING MACHINE

Max Knobel, Arlington, Mass., assignor to Pneumatic Scale Corporation, Limited, Quincy, Mass., a corporation of Massachusetts Application October 29, 1948, Serial No. 57,150

9 Claims. (Cl. 249—48)

This invention relates to a weighing machine.

The invention has for an object to provide a weighing machine of novel construction capable of performing the weighing cycle in an extremely rapid manner and with increased accuracy.

With this general object in view and such others as may hereinafter appear, the invention consists in the weighing machine hereinafter described and particularly defined in the claims at the end of this specification.

In the drawings illustrating the preferred embodiment of the invention, Fig. 1 is a side elevation of a weighing machine embodying the present invention; Fig. 2 is a wiring diagram for the embodiment of the invention shown in Fig. 1; Fig. 3 is an end view of the control mechanism, as viewed from the right of Fig. 1; Fig. 4 is a side elevation of the present weighing mechanism illustrating a modified form of control mechanism embodying the present invention; Fig. 5 is a similar view illustrating a further modification of control mechanism embodying the present invention, and Fig. 6 is an enlarged detail view, in cross-section, of a unit forming a part of the control mechanism shown in Fig. 1.

In general, the invention contemplates the provision of a weighing machine designed to perform the weighing cycle with more accuracy and in a more rapid manner than prior comparable weighing machines of which I am aware. In accordance with the invention the weighing machine is provided with a scale beam and with a control mechanism responsive to minute deflection of the scale beam of the order of from one to ten thousandths of an inch, arranged to initiate the operation of an instrumentality when the scale beam has been thus deflected into a predetermined position. Depending upon the type of weighing machine, the instrumentality whose operation is thus initiated by such minute movement of the scale beam, may for example take the form of an indicator as in a check weigher, or it may take the form of mechanism for controlling the operation of feeding material in a stream upon the scale beam. Preferably the scale beam is heavily spring loaded to have a high natural frequency of vibration, and which is deflected a small amount when the predetermined weight of material is delivered thereon. Such a scale beam lends itself to extremely rapid deflection of from one to ten thousandths of an inch. The control mechanism may take the form of a pneumatic control mechanism responsive to such minute scale beam deflections or a light sensitive control mechanism, or of a control mechanism of a magnetic type as will be described.

Referring now to the drawings, the invention is herein illustrated as embodied in an automatic net weight weighing machine of the type illustrated and described in the United States patent to S. R. Howard, No. 2,364,902, issued December 12, 1944, adapted to permit two weighing operations to be performed during each cycle of operation, first a primary or bulk load weighing operation, and then a final or drip load weighing operation. As herein shown, the illustrated machine comprises a storage hopper 10 for the bulk supply of the material to be weighed and from which the material flows by gravity into an individual material feeding hopper, indicated generally at 12. The material feeding hopper 12 is provided with a rotary drum 14 by which the material is fed through the hopper to be received by a receptacle 16 disposed upon the weighing end of a scale beam indicated generally at 18. In the operation of the machine when the receptacle 16 has received its final load it is arranged to be opened to release its material which is then permitted to flow through a funnel or guide chute 20 into a carton 22 disposed therebeneath. The cartons are supported upon a conveyer belt 24 which is arranged to convey the cartons from a supply thereof into a position beneath the funnel 20 to receive the material, as illustrated in the Howard patent above referred to.

The material feeding hopper 12 may and preferably will comprise the hopper illustrated and described in the Howard Patent No. 2,364,902 to which reference may be had and which comprises a duplex hopper divided longitudinally to form two passageways through which the material passes to be delivered into the receptacle 16. Only one side of the hopper is herein illustrated, the other side being similar in construction and operation, the parts being disposed directly behind the illustrated parts, and for purposes of the present description different numerals have been applied to corresponding parts of each side of the hopper, the two separate passageways being indicated by the numerals 28, 30. Each passageway is provided with its individual gate 32, 34 both of which are arranged to be opened to permit material to be fed to the scale receptacle 16 at the beginning of each cycle of operation. During the weighing cycle each gate is arranged to be closed independently of the other, one gate being closed at the end of the primary or bulk load weighing period and the other gate being closed at the end of the final or drip load weighing period. The gates 32, 34 are held in their open position during the weighing cycle through connections to electro-magnets 36, 38 forming part of a circuit diagrammatically illustrated in Fig. 2. The circuit is arranged to be broken through control mechanism, to be hereinafter described, when the scale beam is moved by the weight of the material in the receptacle during the primary or bulk weighing period to de-energize the electromagnet 36 whereupon the gate 32 is automatically closed. Thereupon, during the continued flow of the drip stream, the scale beam is caused to continue its movement until the final weight is reached whereupon the circuit is broken to de-energize the electro-magnet 38 at the end of the final weighing operation to close the gate 34.

As illustrated in Fig. 1, the gate 32 which is arranged to close the passageway 28, is pivotally mounted at 40 in the hopper frame and is connected by a link 42 to one arm 44 of a two-armed lever rockingly mounted on a stud 46 secured to the hopper. The second arm 48 of the two-armed lever is provided with an armature 50 of the electro-magnet 36. The electro-magnet 36 when energized operates to hold the gate 32 in its open position, and when de-energized, the gate is closed by a spring 52.

Referring now to Fig. 1, the gate 34 which is arranged to close the adjacent passageway 30 is similarly mounted on a pin 54 and is connected by a link 56 to one arm 58 of a two-armed lever pivotally mounted on a stud 60. The second arm 62 of the two-armed lever is provided with a similar armature 64 adapted to engage its electro-magnet 38 when the latter is energized to hold the gate 34 open. A similar spring 66 tends to close the gate 34 when the electro-magnet is de-energized.

Provision is made for rotating the feed drum 14 continuously during the entire weighing cycle, and for stopping the rotation of the drum at the end of the drip feed weighing period through a friction clutch drive as fully illustrated and described in the Howard patent referred to. As herein shown, a pivotally mounted pawl 90 carried by an extension 92 of the two-armed lever 58, 62 is arranged to engage a ratchet 78 to stop the drum at the end of the final weighing period. In operation, when the lever is reset to be held by the electro-magnet 38 at the beginning of a new cycle of operation, as will be described, the pawl 90 is rocked out of the path of the ratchet 78 and the drum 14 is permitted to rotate to feed the material through the hopper.

It will be observed that the drum 14 feeds material continuously into both passageways 28, 30 during the entire weighing cycle and that when the gate 32 is closed the material being fed into the passageway 28, during the final part of the weighing cycle, is permitted to accumulate therein so as to form a bulk load to be released into the scale receptacle 16 at the beginning of the succeeding weighing operation.

From the description thus far it will be observed that the feed drum 14 is arranged to be continuously driven during the weighing cycle to feed material from the supply hopper 10 through the compartments 28, 30 of the feed hopper 12 and that the gates 32, 34 of the hopper are arranged to be independently operated to permit one gate to be closed when a predetermined bulk load has been deposited into the weighing receptacle and to permit closing of the second gate when the final load has been introduced into the weighing bucket 16. As illustrated in Fig. 1, an adjustable gate 96 is provided above the feed drum 14 in order to control the amount of material being withdrawn from the supply hopper.

Referring now particularly to Fig. 1, the scale beam generally indicated at 18, comprises in effect a spring loaded balance system particularly designed to perform the weighing cycle in a fast and accurate manner and, as herein shown, comprises a rigid beam member 100 provided with a flexible fulcrum comprising a strip of thin spring steel 102 disposed at right angles to the beam and connected between a lug 104 depending from the mid-portion of the beam and a lug 106 upwardly extended from a base member 108. A pair of compression springs 110 disposed substantially equidistantly on either side of the flexible fulcrum is interposed between the base member and the underside of the beam 100, the springs 110 being retained in suitable sockets and initially compressed to provide considerable tension in the steel strip 102 thus forming a spring loaded resonant balance system having a relatively high frequency of vibration preferably approximately in the order of five to fifteen cycles per second so that the deflection of the beam when a weight is added to one end thereof is relatively small to provide a relatively rapid action during the weighing operation.

As herein shown, the beam member 100 is provided with the receptacle or receiver 15 supported on knife edges 112 at the weighing end of the beam and is provided with the usual counter-weight 114 at the other end of the beam. The receptacle is maintained in a vertical position by a parallel link 116 connected between the lower end of the receptacle and an arm 118 depending from the underside of the platen 120. In order to prevent the vibrations set up in the frame of the weighing machine from effecting the action of the resonant balance system, the spring loaded scale beam unit 18 may be supported from the platen or support 120 on compression springs 122 interposed between the platen and the underside of the base member, the springs being maintained in their compressed condition by bolts 124 and nuts 126 connecting the base member to the platen, as illustrated. A felt spacing collar 128 surrounding each spring 122 and also interposed and compressed between the platen and the base member further assists in damping the vibrations from the machine frame.

In order to damp and prevent premature and undesirable vibratory oscillations of the beam 100 during the weighing cycle, a dashpot 130 is provided having a loose fitting piston 132 moving in oil, the piston being rigidly connected by a rod 134 to the counter-weight end of the beam 100. The dashpot 130 is secured to the underside of the base member 108 and the rod 134 extends through an opening 136 in the base member with clearance to permit freedom of movement of the rod. The dashpot is preferably so proportioned that the degree of damping effected is such as to permit deflection of the beam 100 from its initial to its final position during the weighing cycle without any additional oscillations. In other words, the effective damping is so correlated with respect to the resonant beam system that the time for the beam to be deflected from its initial to its final position is approximately equal to the period of one oscillation, in the present instance being of the order of one-tenth to one-fifteenth of a second or less. With this construction, it will be seen that in operation, the back or counter-weight end of the scale beam 100 is initially urged downwardly by the counter-weight 114, the end of the scale beam preferably resting against a suitable stop, as will be described, and as material is introduced into the scale receptacle 16, the spring-loaded beam will not be deflected until such time as the weight of the material overcomes the counter-weight 114 and the preset spring tension. When the predetermined weight is reached the counter-weight end of the scale beam will be deflected upwardly with a uniform motion without undesired oscillations and provision is made for effecting termination of the material feed upon movement of the beam through a distance of a few thousandths of an inch. In the illustrated weighing machine provision is preferably made for effecting the termination of the bulk stream flow immediately after the beam has moved one or two thousandths of an inch and for thereafter terminating the drip stream after the scale has moved one or two thousandths of an inch.

Referring now particularly to Figs. 1, 2 and 3, the control mechanism for reducing the flow of the material when a bulk weight is reached and for discontinuing the flow of material when a final weight is reached in response to minute movement of the scale beam, includes a pair of pneumatically operated conduit units 140, 142 arranged to cooperate with an extension of the counter-weight end of the scale beam 100. The lower unit 140 is connected to a pneumatically operated pressure responsive element, herein shown as a Bourdon tube 144 arranged to operate a magnetic switch 146, of known construction, forming a part of the circuit to the bulk gate solenoid 36, and the upper unit 142 is connected to a similar Bourdon tube 148 arranged to operate a magnetic switch 150 forming a part of the circuit to the drip gate solenoid 38, as illustrated in Fig. 1. One available form of magnetic switch comprises a pair of contacts sealed in a glass tube and having a pool of mercury at its lower end. One of the contacts is fixed in the mercury the other being movable into and out of the mercury to close and open the circuit under the influence of magnets 151, 153 connected to and movable with its respective Bourdon tube 144, 148. The magnetic switches 146, 150 herein illustrated are of the normally open type and are arranged to be held in their closed position by their magnets 151, 153 when the latter are rocked into a vertical position, as indicated in Fig. 1.

As illustrated in Fig. 3, the counter-weight end of the scale beam 100 is extended between the upper and lower pneumatic control units 142, 140, the scale beam normally being in contact with the lower unit 140 to maintain a predetermined pressure in the Bourdon tube 144, as will be described, and to thus maintain the magnet 151 in its vertical position to maintain the magnetic switch 146 in its closed position. Thus, in operation, when the pressure is reduced in the Bourdon tube 144, upon minute upward movement of the scale beam from engagement with the lower unit 140, the magnet 151 is rocked away from its switch 146 to open the circuit to the solenoid 36 and effect closing of the gate 32.

After the bulk load gate has been closed in the manner above described, the drip stream continues to flow into the receptacle and the counter-weight end of the scale beam 100 continues to move upwardly a minute distance until it arrives in a position spaced a minute distance from the discharge orifice of the upper unit 142. The upper unit 142 is normally open and the Bourdon tube 148 is arranged to maintain its magnet 153 in a vertical position under a reduced pressure so that when the counter-weight end of the scale beam 100 reaches the aforesaid position a minute distance from the discharge orifice of the upper unit 142, the pressure is increased in the Bourdon tube 148 in a manner to be described, and the magnet 153 is rocked away from its switch 150 to open the circuit to the solenoid 38 to effect closing of the drip load gate 34.

As illustrated in detail in Fig. 6, the pneumatic control units 140, 142 are similar in construction and mode of operation. Each comprises a conduit provided with a small discharge orifice 158 at its discharge end and with which the extended end of the counter-weight end of the beam 100 cooperates to open and close the orifice 158. In the normal position of the beam during that portion of the cycle of the machine in which the bulk stream is being delivered into the weighing receptacle 16, the extended end of the beam rests upon and closes the discharge orifice 158 of the unit 140. Each control unit is provided with a restricted throat 156 spaced from the discharge orifice 158 and connected by an intervening chamber 154. Air under pressure is supplied to each control unit by connection of a fitting 152' with one of the pipes 164, 166 connected to a source of supply of compressed air through pipes 160, regulating valve 162 and pipe 160, as shown in Fig. 1. Each control unit is also provided with a fitting 154' connected by flexible pipes 168, 170 to one end of the Bourdon tubes 144, 148. From a consideration of Fig. 6 it will be observed that air under a definite pressure, such for example as 50 lbs. per square inch, may be supplied to the entrance end of the control unit 140 and to the chamber 152 thereof, and because of the resistance offered by the throat 156, the pressure within the second chamber 154 and between the discharge orifice 158 and throat 156 will be substantially lower than in the chamber 152, but still sufficient to operate the Bourdon tube 144 to maintain the magnet 151 in a vertical position and thus maintain the magnetic switch 146 in its closed position. This occurs during the bulk weighing period of operation when the end of the beam closes the discharge orifice 158. Upon minute upward movement of the scale beam after the bulk weight has been reached, the opening of the discharge orifice 158, even as little as .001 of an inch, operates to substantially reduce pressure in the chamber 154 and consequently in the Bourdon tube thus rocking the magnet 151 away from its switch 146 and opening the circuit to the solenoid 36 to close the gate 32 as above described. As shown in Fig. 1 the upper pneumatic control unit 142 is inverted and arranged to operate its Bourdon tube in a manner just the reverse of the operation of the lower unit 140. The unit 140 is arranged so that during the bulk loading operation above described its discharge orifice 158 remains open and as a result the pressure within the Bourdon tube 148 is maintained at a lower value whereby the magnet 153 is maintained in vertical position. When the scale beam approaches the discharge orifice 158 of the unit 142, as above described, pressure is instantly increased within the chamber 154 of such unit and also within the Bourdon tube 148 to thereby immediately rock the magnet 153 from its switch 150 to open the circuit to the solenoid de-energizing the same and thus effecting closing of the drip stream gate 34 as above described.

In practice, the pneumatic control units may be adjusted relative to the spring-loaded and counter-weighted scale beam 18 so that the beam is normally down at the counter-weight end against the top of the unit 140, the upper or discharge end thereof serving as a stop for limiting the movement of the scale beam in this direction. As material is added to the weighing end of the beam, the latter will remain at rest until such time as the weight overcomes the counter-weight 114 and the preset spring tension of the spring-loaded scale beam. In the illustrated embodiment of the invention, for example, if the final weight to be obtained is 16 ounces, adjustments may be made so that the beam leaves the lower control unit 140 when approximately 14 ounces has been introduced into the receptacle 16 to effect closing of the gate 32 to shut off the bulk stream feed. In the continued operation of the machine, the fine or drip stream feed continues and the beam moves gradually until it approaches the inverted control unit 142, adjustments being made so that the unit 142 will effect closing of the gate 34 to entirely and rapidly shut off the feed of the material when the final weight of 16 ounces is reached.

As above described, the pneumatic control units are so constructed that a large pressure change occurs after a movement of the beam through a minute distance, such as one thousandth of an inch. Thus, in practice, the lower unit 140 may be adjusted relative to the scale beam so as to effect closing of the bulk load gate upon movement of the beam one thousandth of an inch and the upper unit 142 may be adjusted to effect closing of the drip load gate by movement of the beam during its last one thousandth of an inch as it nears the discharge orifice of the upper unit so that the total travel of the scale beam between the two units need be only a few thousandths of an inch, and in practice successful and efficient operation has been experienced with a total beam movement of from three to eight thousandths of an inch. The fast action thus obtained greatly reduces the time required for completion of the weighing cycle resulting in exceedingly accurate weights minimizing the effect of lack of uniformity of stream flow of the material being weighed.

In the actual operation of the machine there is no apparent delay in the rocking movement of the scale beam once it has started to move until both gates 32, 34 are closed through the control mechanisms described, so that, in practice, a continuous rocking movement of the scale beam through a minute distance effects closing of the bulk load gate and then the drip load gate in rapid succession in accordance with the weight of the material deposited into the receptacle by the continuously flowing stream, thus enabling the weighing cycle to be performed rapidly without sacrificing accuracy. It will be apparent that the pneumatic control units 140, 142 are self-cleaning thus preventing dust or other foreign matter from accumulating in the orifice 158 or other passageways.

At the end of the final portion of the weighing cycle provision is made for releasing the weighed loads in the receptacles to permit the material to fall by gravity through the funnel 20 and into the carton 22 placed therebeneath. As herein shown, the bottom of the receptacle comprises two shutters 172, 174 pivotally mounted on the receptacle and normally held in their abutting and closed position by springs 176, 178. The shutters are connected by toggle links 180, 182 provided with a roller 186 at their connected ends adapted to be engaged by an arm 188 to operate the toggle linkage to effect opening of the shutters. As illustrated in Fig. 1, the arm 188 is arranged to be operated through connections from a cam 190 fast upon a one revolution cam shaft 192 journaled in suitable bearings in the machine frame. A bell crank 194 pivotally mounted on a cross shaft 196 carries a roller 198 on one arm, the other arm being connected by a link 200 to a lever 202 clamped to a rocker shaft 204. The operating arm 188 is also fast upon the rocker shaft 204 so that through the connections described the receptacle is opened to deliver the weighed load to the carton disposed therebeneath.

Provision is also made at the end of the final portion of the weighing cycle for resetting the parts in their original position in order to enable the scale to perform another weighing cycle. As illustrated in Fig. 1, the armatures 50, 64 of the electro-magnets 36, 38, respectively, are arranged to be returned into operative engagement with their electro-magnets through connections from a cam 206 mounted fast upon the cam shaft 192. The cam 206 is arranged to cooperate with a roller 208 carried by a cam lever 210 pivotally mounted at 196 and the lever 210 is connected by a link 212 to an arm 214 clamped on a rocker shaft 215. The rocker shaft is provided with rocker arms 216, 218 fast thereon which are arranged to engage rollers 220, 222 carried by the arms 44, 58 respectively to rock the latter on their pivots 46, 60 to effect the resetting operation. It will also be observed that resetting of the arm 58 effects removal of the pawl 90 from its ratchet 78 to permit the drum 14 to be again rotated to feed the material. As previously described, the pawl 90 is brought into engagement with the ratchet 78 at the end of the drip weighing portion of the cycle to discontinue the feed of material.

The cam shaft 192 may be rotated in any usual or preferred manner preferably through connections from the weighing machine driving mechanism in the manner illustrated and described in the Howard Patent No. 2,364,902. In practice, the cam shaft is controlled by a one revolution clutch, not shown, arranged to permit the cam shaft to make one revolution at the end of each weighing cycle to effect release of the weighed load and to reset the filling and weighing mechanism as above described. It will be apparent that as soon as the weighed load of material is released from the receptacle 16, the spring-loaded scale beam 100 will quickly return to its normal or weighing position of its own accord, thus eliminating any scale resetting mechanism as formerly required.

Referring now to Fig. 4, a modified form of control mechanism responsive to a minute movement or impulse of the scale beam 100 comprises in general a "balanced bridge coil circuit," indicated generally at 250, arranged so that any movement of the counter-weight end of the scale beam unbalances the magnetic field of the coils whereby a minute increment of movement of the scale beam is magnified electrically to actuate relays adapted to open the circuits to the solenoids 36, 38 successively when a predetermined bulk load and drip load respectively have been introduced into the receptacle 16.

As herein shown, the balanced bridge coil circuit 250 includes a pair of adjustable coils 252, 254 which have independent magnetic fields and between which the counter-weight end of the scale beam is extended, the interposed end of the scale beam serving as an armature floatingly mounted between the coils. The circuit is powered by an A. C. line 256 having a voltage regulator 258 for eliminating errors due to power fluctuations, and further includes a transformer 260, a rectifier 261 and a pair of relays of different sensitivity 262, 264 arranged to cooperate with contacts 266, 268 in the circuits for the solenoids 36, 38 respectively.

In the operation of the device, when the armature end of the scale beam moves upwardly, it unbalances the magnetic fields between the two coils 252, 254 which produces a relatively large unbalanced current for a very small movement of the armature. Thus, in the illustrated embodiment of the invention, when a minute movement of the scale beam occurs in response to a predetermined bulk load weight, the relay 262 will be energized at a relatively low current to open the contacts 266 of the solenoid 36 thus effecting closing of the bulk load gate 32. Upon a further gradual minute upward movement of the armature end of the scale beam in response to an additional amount of material added to the receptacle 16 during the continued operation of the machine, the relay 264 will be energized at a relatively higher current corresponding to a beam position for the final weight, to open the contacts 268 of the solenoid 38 and effect closing of the drip load gate 34.

As illustrated in Fig. 5, another modification of control mechanism responsive to a minute movement of the scale beam 100 for successively cutting off the bulk stream and the drip stream in response to a predetermined bulk load and drip load respectively introduced into the receptacle 16 may comprise an electrical circuit including a light sensitive cell 270. As herein shown, the photo-electric cell 270 is mounted to receive the rays from a light source 272, having a condensing lens 274, the focus point of the converged rays being arranged to pass through a relatively small aperture 276 in a shield member 278 attached to the stationary base plate 108, as illustrated. A light intercepting blade 280 is mounted on the counter-weight end of the scale beam 100 adjacent the shield member 278 and is arranged to cut off a portion of the light as the scale beam moves through a minute distance during the weighing operation. The photo-cell 270 forms part of a circuit having a conventional amplifier 282 adapted to respond to variations in the amount of light directed onto the photo-cell, the amplifier being connected to two relays 284, 286 arranged to open the circuits to the bulk solenoid 36 and the drip solenoid 38 at contacts 288, 290 respectively.

In the operation of the control mechanism illustrated in Fig. 5, when the counter-weight end of the scale beam moves upwardly a predetermined minute distance in response to a primary load weight, the intercepting blade 280 cuts off a portion of the light rays which will effect operation of the relay 284 to open the contacts 288 in the circuit to the solenoid 36 to thus permit closing of the bulk load gate. Upon a further gradual minute upward movement of the counter-weight end of the scale beam in response to an additional final weight amount of material added to the receptacle 16 during the continued operation of the weighing mechanism, a further portion of the light rays will be cut off which will effect operation of the relay 286 to open the contacts 290 in the circuit to the solenoid 38 to thus permit closing of the drip load gate.

In prior constructions of weighing machines embodying electrical contacts, relays, and circuits for operating the material feed control devices, a substantial time interval intervenes between the deposition of the predetermined weight of material on the scale beam and the time that the control devices are operated to cut off delivery of more material upon the scale beam. The amount of material added during this time is substantial and is usually referred to as the "added increment." Variations in the uniformity of the stream flow produce substantial variations in the weight of this "added increment," and it is the aim of the present invention to effect the operation of the control devices to cut off the material feed as quickly as possible after a predetermined weight has been deposited upon the scale beam. The present construction of weighing element involving the embodiment of stiff springs to load the beam leads to the production of an extremely small displacement of the beam when a given weight of material is added to the weighing end of the beam. This small displacement is produced in an extremely small time, and provision is made for actuating the control devices to cut off the material feed by the above described pneumatic control mechanisms which are sensitive to this small motion. It is preferred to damp the vibrations of the resonant system, preferably to a degree substantially that of so-called critical damping in which the beam deflects from its initial to its final position with substantially no additional oscillations. With this amount of damping the time required for the beam to deflect from one position to the other approximates the time of one oscillation of the beam and with the stiff spring loaded beam the natural frequency varies from five to fifteen oscillations per second and is preferably of the order of ten oscillations per second, so that the time required for completing the minute movement of the scale beam varies from one-fifth to one-fifteenth of a second or less, and is preferably about one-tenth of a second.

It will also be observed that utilizing the pneumatic control units for cutting off the bulk and drip streams when the control operates, the scale beam is free, having opened the lower orifice to cut off the bulk stream and subsequently move to near the upper orifice to cut off the drip stream, and as a result the material feed controls are operated immediately after the beam has been moved by the addition of the predetermined weights to the weighing end of the beam.

While as above described the weighing cycle is completed in an extremely rapid manner, due to the fast action of the spring loaded beam, nevertheless it is appreciated that a small amount of time is also consumed by the flow of air into and from the pneumatic control mechanism when the described increase or drop in air pressure is being effected within the control unit, and accordingly in practice it is advisable that the size of the control units be designed so that the volume of air thus required to flow into and from the pneumatic control units is as small as practicable.

While the invention has been illustrated in connection with a weighing machine embodying mechanism for feeding a bulk and a drip stream upon the scale beam, it will be understood that viewed in its broader aspects the invention may be embodied in other forms of weighing machines in which different instrumentalities may be employed whose operation is initiated and/or terminated by the control mechanism sensitive to the minute deflections of the scale beam. For example, such an instrumentality may be the indicator of a check weigher, or mechanism for selectively separating over and under weight packages.

Having thus described the invention, what is claimed is:

1. A weighing machine, comprising: a receiver; means for feeding material to said receiver; a support; means yieldably opposing movement of said receiver relative to said support, said means comprising oppositely acting spring means opposing movement of said receiver by the weight of material deposited therein; and means responsive to deflection of said spring means of the order of about .001 of an inch for interrupting the feed of material to said receiver.

2. A weighing machine, comprising: a weighing beam; a receiver supported by said weighing beam; means for feeding material into said receiver; a support; fulcrum means mounting said weighing beam for pivotal movement relative to said support; spring means interposed between said beam and support on either side of said fulcrum means, said spring means being compressed and opposing rocking movement of said weighing beam until a predetermined weight of material has been deposited into said receiver; and feed control means actuatable in response to rocking movement of said weighing beam of the order of about .001 of an inch for interrupting the feed of material to said receiver.

3. A weighing machine as defined in claim 2, in which the fulcrum means is a flexible strip.

4. A weighing machine as defined in claim 2, in which the fulcrum means is a flexible strip and the spring means comprises helical springs under compression and producing tension in said flexible strip.

5. A weighing machine as defined in claim 2, in which the material feeding means comprises a bulk feed device and a dribble feed device and in which the control means comprises elements operable in rapid succession in response to movement of said weighing beam not exceeding a total movement of about .008 of in inch for successively interrupting the bulk feed and the dribble feed.

6. In a weighing machine, a weighing beam; a receiver supported by said weighing beam; means for feeding material to said receiver; a support; fulcrum means mounting said weighing beam for pivotal movement relative to said support; spring means interposed between said weighing beam and support on either side of said fulcrum means and preloading said weighing beam; and control means for said material feeding means comprising a pneumatic conduit member having an orifice therein which is normally obstructed by said weighing beam, and means responsive to changes in pressure in said conduit member for effecting interruption of the material feed as said beam is moved away from obstructing position relative to said orifice.

7. In a weighing machine, a weighing beam; a receiver supported by said weighing beam; bulk and dribble feed means for feeding material to said receiver; a support; fulcrum means mounting said weighing beam for pivotal movement relative to said support; spring means interposed between said weighing beam and support on either side of said fulcrum means and preloading said weighing beam; control means for said material feeding means comprising a pair of conduit members each connected with a source of air under pressure and having an orifice therein adapted to be successively obstructed by said weighing beam; and means responsive to changes in pressure in one of said conduit members for effecting interruption of the bulk feed as said beam is moved away from obstructing position relative to the orifice of said one conduit member, and means responsive to changes in pressure in the other of said conduit members for effecting interruption of the dribble feed as said beam moves into obstructing position relative to the orifice in said other conduit member.

8. In a weighing machine, a movable load receiving means; oppositely acting stiff spring means cooperating with the load receiving means and controlling the movement of the load receiving means, the stiffness of the spring means and the weight of the load-receiving means together with the weight of the load being weighed forming at the time of stream feed cut-off, a resonant system having a natural frequency of vibration of the order of from five to fifteen cycles per second, damping means connected with the load receiving means for damping the vibrations thereof, said spring means and damping means cooperating to cause the position of the load receiving means during the last part of the weighing operation to essentially correspond to the weight of the load thereon; material feeding means for feeding material onto the load receiving means, means for interrupting the feeding of material; and sensitive control means cooperating with the load receiving means and actuated by movement of the load receiving means through a distance not exceeding .001 of an inch to actuate said feed interrupting means.

9. In a weighing machine, in combination, a weighing element, material feeding means for feeding a bulk and a drip stream to the weighing element, and means controlled by movement of the weighing element of the order of about .001 of an inch for controlling the operation of said material feeding means, said means comprising two pneumatic control units, each having conduit means through which air under substantial pressure may flow, said conduit means having a reduced discharge orifice, a restricted throat portion spaced in advance of the discharge orifice for offering a resistance to the flow of air therethrough, said pneumatic control units being mounted to dispose their discharge orifices toward each other and in spaced relation, means movable with the weighing element to open one discharge orifice and upon continued movement of the scale beam to approach the second discharge orifice to restrict the discharge of air therefrom, said movements effecting substantial air pressure variation within the conduits between the discharge orifices and the throats of said control units, and mechanism actuated by such pressure variation for controlling the material feeding means to discontinue first the bulk stream and then the drip stream.

MAX KNOBEL.

(References on following page)

REFERENCES CITED

The following references are of record in the file of this patent:

UNITED STATES PATENTS

| Number | Name | Date |
|---|---|---|
| 628,894 | Outcalt | July 11, 1899 |
| 2,022,659 | Fisher | Dec. 3, 1935 |
| 2,058,775 | Cundall | Oct. 27, 1936 |
| 2,071,443 | Weckerly | Feb. 23, 1937 |
| 2,170,249 | Misner | Aug. 22, 1939 |
| 2,197,514 | Barnes | Apr. 16, 1940 |
| 2,207,885 | Howard | July 16, 1940 |
| 2,212,419 | Harmon | Aug. 20, 1940 |
| 2,224,812 | Flanagan | Dec. 10, 1940 |
| 2,264,562 | Bryant | Dec. 2, 1941 |
| 2,364,902 | Howard | Dec. 12, 1944 |
| 2,371,040 | Fisher | Mar. 6, 1945 |